UNITED STATES PATENT OFFICE.

LUDWIG BENDA, OF FRANKFORT-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

5-NITRO-2-AMINOBENZENE-1-ARSINIC ACID.

1,036,784.  Specification of Letters Patent.  Patented Aug. 27, 1912.

No Drawing.  Application filed December 28, 1911. Serial No. 668,204.

*To all whom it may concern:*

Be it known that I, LUDWIG BENDA, Ph. D., chemist, a citizen of the Empire of Germany, residing at Frankfort-on-the-Main, Germany, have invented certain new and useful Improvements in 5-Nitro-2-Aminobenzene-1-Arsinic Acid, of which the following is a specification.

I have found that by heating the para-nitranilin with arsenic acid, the 5-nitro-2-aminobenzene-1-arsinic acid is obtained.

The new compound is of great value as a parent-product for the manufacture of hitherto-unobtainable aromatic arsenic compounds which can be used for therapeutical purposes.

Example: 20 kilos of arsenic acid are finely ground with 70 kilos of para-nitranilin and then heated on the oil-bath to about 210° C. The thick melt is then introduced into a solution of 250 liters of water and 20 kilos of sodium carbonate. The mass is stirred for some time and sodium carbonate added in order to continually maintain a strongly alkaline reaction. The solution is then separated and saturated with common salt. After repeated filtration the solution is shaken out with ether in order to remove the dissolved nitranilin which may be present in small quantities. To the aqueous alkaline liquid is then added hydrochloric acid, whereby the 5-nitro-2-aminobenzene-1-arsinic acid precipitates in the form of a lemon-colored powder, which is filtered off, washed with cold water and dried.

The new compound, which is only very difficulty soluble in cold water, can be recrystallized from boiling water. It melts at 235–236° C. while decomposing. It is very readily soluble in alkalis, alkali carbonates, ammonia and sodium acetate, also soluble in the heat in methyl-alcohol and alcohol; it is very difficultly soluble in the cold in diluted acids. When treated with sodium nitrite and hydrochloric acid, it yields a readily soluble and scarcely colored diazo compound which easily combines with the various components of azo dyestuffs.

Having now particularly described my invention, what I claim is:

As a new product, the 5-nitro-2-amino-benzene-1-arsinic acid, being a lemon-colored compound, readily soluble in alkalis, alkali carbonates, ammonia and sodium acetate, also soluble in the heat in methyl alcohol and alcohol, very difficultly soluble in cold diluted acids; yielding when treated with sodium nitrite and suspended in a solution of a mineral acid, a slightly-colored diazo compound.

In testimony whereof, I affix my signature in presence of two witnesses.

LUDWIG BENDA.

Witnesses:
JEAN GRUND,
CARL GRUND.